(12) United States Patent
Smirnov et al.

(10) Patent No.: US 7,604,690 B2
(45) Date of Patent: Oct. 20, 2009

(54) COMPOSITE MATERIAL FOR ULTRA THIN MEMBRANES

(75) Inventors: Valery K. Smirnov, Yaroslavl (RU); Dmirti S. Kibalov, Yaroslavl (RU)

(73) Assignee: Wostec, Inc., San Francisco, CA (US)

( * ) Notice: Subject to any disclaimer, the term of this patent is extended or adjusted under 35 U.S.C. 154(b) by 420 days.

(21) Appl. No.: 11/100,175

(22) Filed: Apr. 5, 2005

(65) Prior Publication Data

US 2006/0230937 A1 Oct. 19, 2006

(51) Int. Cl.
*B01D 53/22* (2006.01)
*H01L 21/336* (2006.01)

(52) U.S. Cl. ............... 96/11; 438/257; 438/961; 438/962

(58) Field of Classification Search ............ 96/11; 438/961–962, 257
See application file for complete search history.

(56) References Cited

U.S. PATENT DOCUMENTS

| | | | |
|---|---|---|---|
| 4,857,080 A | 8/1989 | Baker et al. | |
| 5,160,618 A | 11/1992 | Burggraaf et al. | |
| 5,498,278 A * | 3/1996 | Edlund | 96/11 |
| 5,652,020 A | 7/1997 | Collins et al. | |
| 5,702,503 A * | 12/1997 | Tse Tang | 95/45 |
| 5,734,092 A | 3/1998 | Wang et al. | |
| 5,753,014 A * | 5/1998 | Van Rijn | 96/12 |
| 6,274,007 B1 | 8/2001 | Smirnov et al. | |
| 6,580,172 B2 * | 6/2003 | Mancini et al. | 257/762 |
| 6,706,576 B1 * | 3/2004 | Ngo et al. | 438/197 |
| 6,810,899 B2 * | 11/2004 | Franz et al. | 137/79 |
| 6,954,275 B2 * | 10/2005 | Choi et al. | 356/614 |
| 7,001,446 B2 * | 2/2006 | Roark et al. | 95/56 |
| 7,175,694 B2 * | 2/2007 | Ma et al. | 95/56 |
| 7,338,275 B2 * | 3/2008 | Choi et al. | 425/385 |
| 2004/0129135 A1 * | 7/2004 | Roark et al. | 95/55 |
| 2006/0205875 A1 * | 9/2006 | Cha et al. | 525/88 |
| 2007/0082457 A1 * | 4/2007 | Chou et al. | 438/427 |

OTHER PUBLICATIONS

International Search Report and Written Opinion mailed Jun. 26, 2008, which issued during the prosecution of International Patent Application No. PCT/US06/11420.

* cited by examiner

*Primary Examiner*—Walter D Griffin
*Assistant Examiner*—Amber Orlando
(74) *Attorney, Agent, or Firm*—Darby & Darby PC

(57) ABSTRACT

A composite material that may be used for a thin membrane is disclosed. This composite material includes first material that has a quasi-periodic system of vertical trenches (nanotrenches) with wavelength period that may be in the range between 20 and 500 nm. These nanotrenches are formed as openings between bordering elongated elements. The nanotrenches are at least partially filled with a second material that has physical-chemical characteristics substantially different from the first material.

31 Claims, 12 Drawing Sheets

COMPOSITE MATERIAL FOR ULTRA THIN MEMBRANES

BACKGROUND OF THE INVENTION

A vast variety of technical applications rely on ultra thin multilayer materials to create key technical components.

For example, FIG. 1 shows an ultra thin membrane for hydrogen separation, which is built by depositing a thin layer of palladium (Pd) or a palladium alloy on a porous ceramic support. In this example, the rate of hydrogen transmission (throughput) through the membrane is proportional to the differential pressure $\Delta P$ and inversely proportional to the membrane thickness D. It is possible to significantly improve the throughput by increasing the differential pressure and decreasing the thickness of the membrane. A number of references, U.S. Pat. No. 6,810,899, U.S. Pat. No. 5,734,092, U.S. Pat. No. 5,652,020, U.S. Pat. No. 5,160,618, U.S. Pat. No. 4,857,080, incorporated herein by reference, disclose ultra thin membrane designs, with membrane thickness D ranging from 0.5 µm to 20 µm, which are able to sustain differential pressures up to about 1 atmosphere.

However, a possibility of mechanical failures at certain pressures limits the minimum membrane thickness. For example, U.S. Department of Energy research on a Membrane System for $H_2$ Production under cooperative agreement No. DE-FC36-00GO10534 discloses a palladium membrane built on a porous substrate having an average pore size of less than 5 µm. The main disadvantage of this technique is in the fact that it is extremely difficult to completely exclude large outliers in pore distribution. In the above referenced case of a porous substrate, the authors report maximum pore size of 50 µm. This may lead to a mechanical breakdown and decreased separation factor for membranes with thickness less then 10 µm.

A 2004 National Energy Technology Laboratory research project entitled "Production of Pure Hydrogen from Hydrocarbons Using a Palladium Membrane Reactor", funded by the Department of Energy, states the goal of attaining a Pd/Cu alloy membrane with thickness below 5 µm on porous ceramic supports. The publication also indicated that it is planned to achieve 1 µm thickness for Pd/Cu alloys on Group V-b metal foils.

An alternative approach, disclosed in the U.S. Pat. No. 6,810,899, suggests building perforated support plates for ultra thin membranes. The perforation is achieved by applying lithography methods to make small holes in the support structures. In this approach, the support structure has a very high aspect ratio (the ratio of the hole depth to the hole diameter) to achieve high durability and throughput. It is not a trivial exercise to build dense arrays of holes using existing lithography tools. Moreover, in order to push the membrane thickness below 0.1 µm, the hole diameter should be within the sub-100 nm range. It is very difficult to reliably fabricate such structures using existing lithography methods.

A wide variety of technology applications (defense, military, energy, automotive, etc.) create a demand to further miniaturize the membrane systems. There is also a need to further improve the productivity and reliability of the existing ultra thin membrane systems.

DETAILED DESCRIPTION OF THE INVENTION

A preferred embodiment provides key components for fabricating high performance, reliable, ultra thin membranes. It also features novel ultra thin membrane designs and devices incorporating ultra thin membranes.

Ultra thin membranes can be used to separate a specific component from a mixture of components or to catalyze a chemical reaction. Typically the membrane is placed as an interface between two regions with a pressure or concentration gradient applied across the membrane causing only certain components from one region to be transported into the other region. The separation is done by the active part of the membrane. The productivity of the membrane is approximately directly proportional to the pressure (concentration) gradient across the membrane and the surface area of the active component and inversely proportional to the thickness of the membrane.

One embodiment provides a composite structure wherein one material provides a skeleton with strong mechanical characteristics and high aspect ratio, while a second material provides an active component with catalytic and/or material separation properties.

In one embodiment the skeleton is fabricated by creating a system of nanotrenches in the first material. The method of fabrication is discussed subsequently in connection with FIGS. 6a-6j. The system of nanotrenches is a quasi-periodic, anisotropic system of vertical trenches with the period, $\lambda$, preferably falling into the range between 20 and 400 nm. Nanotrenches are formed as openings between bordering elongated elements—nanostringers. The nanostringers preferably have cross-section dimensions in the 10-250 by 100-2500 nm range. In some preferred embodiments the nanotrenches and/or nanostringers can compose a continuous net.

The geometry and the topology of the trenches can be important for the performance of membrane, because they determine the device mechanical durability and the permeability of the system. Different variants of the topology are possible. The desired topology should not only provide durability but it should have sufficient permeability as well.

Figure 1:
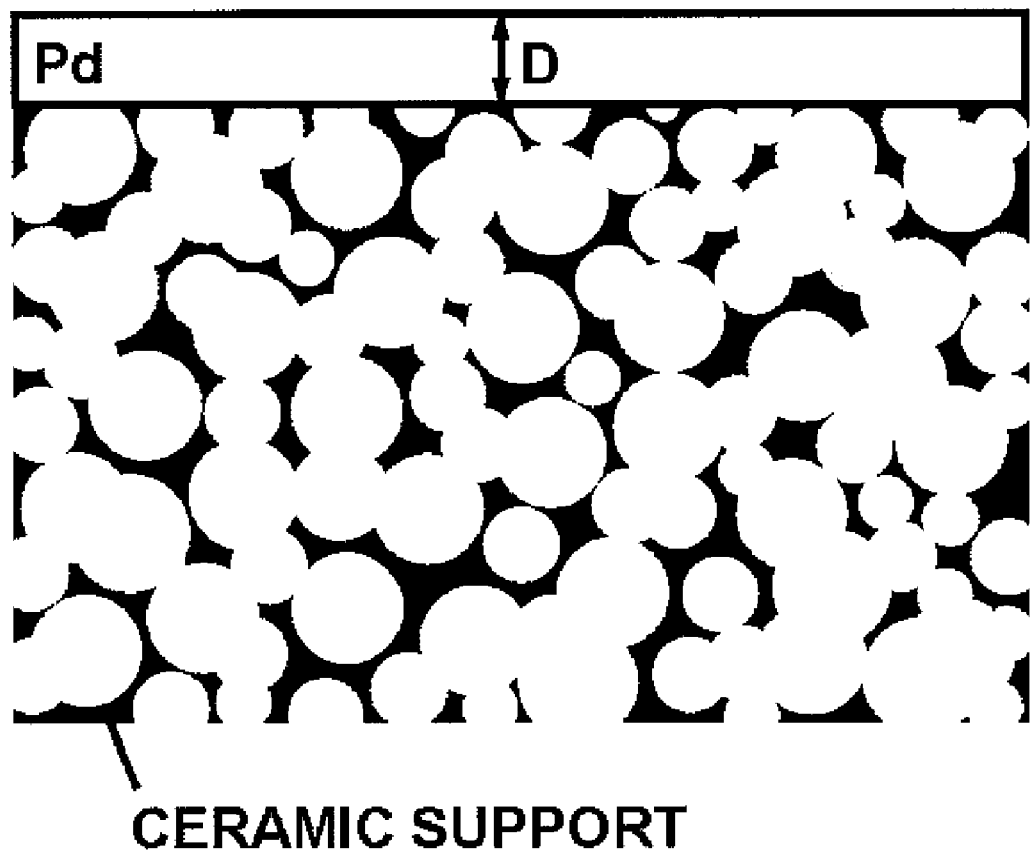
FIG. 1 is a cross-section of an ultra thin prior art membrane for hydrogen separation.
Figure 2:
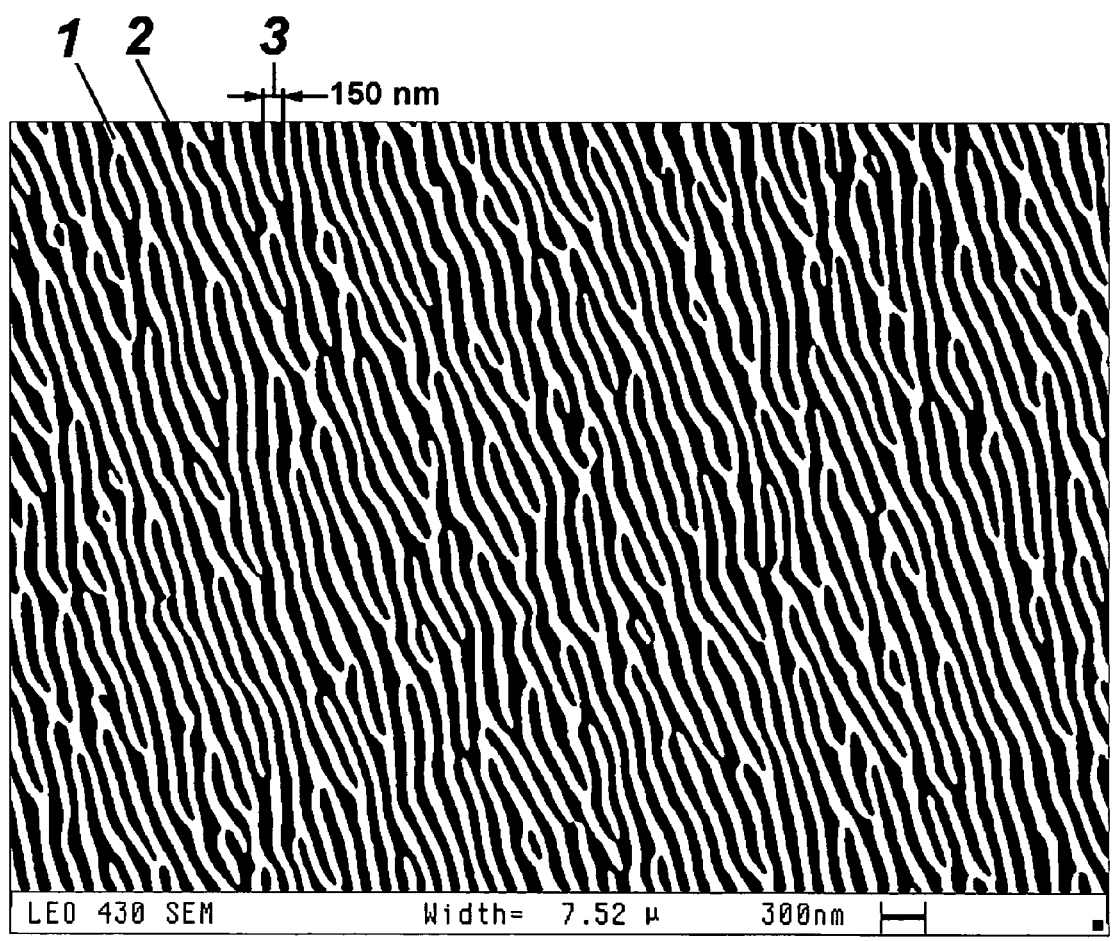
FIG. 2 is a top view of one embodiment of a nanotrench system, according to the invention.
Figure 3:
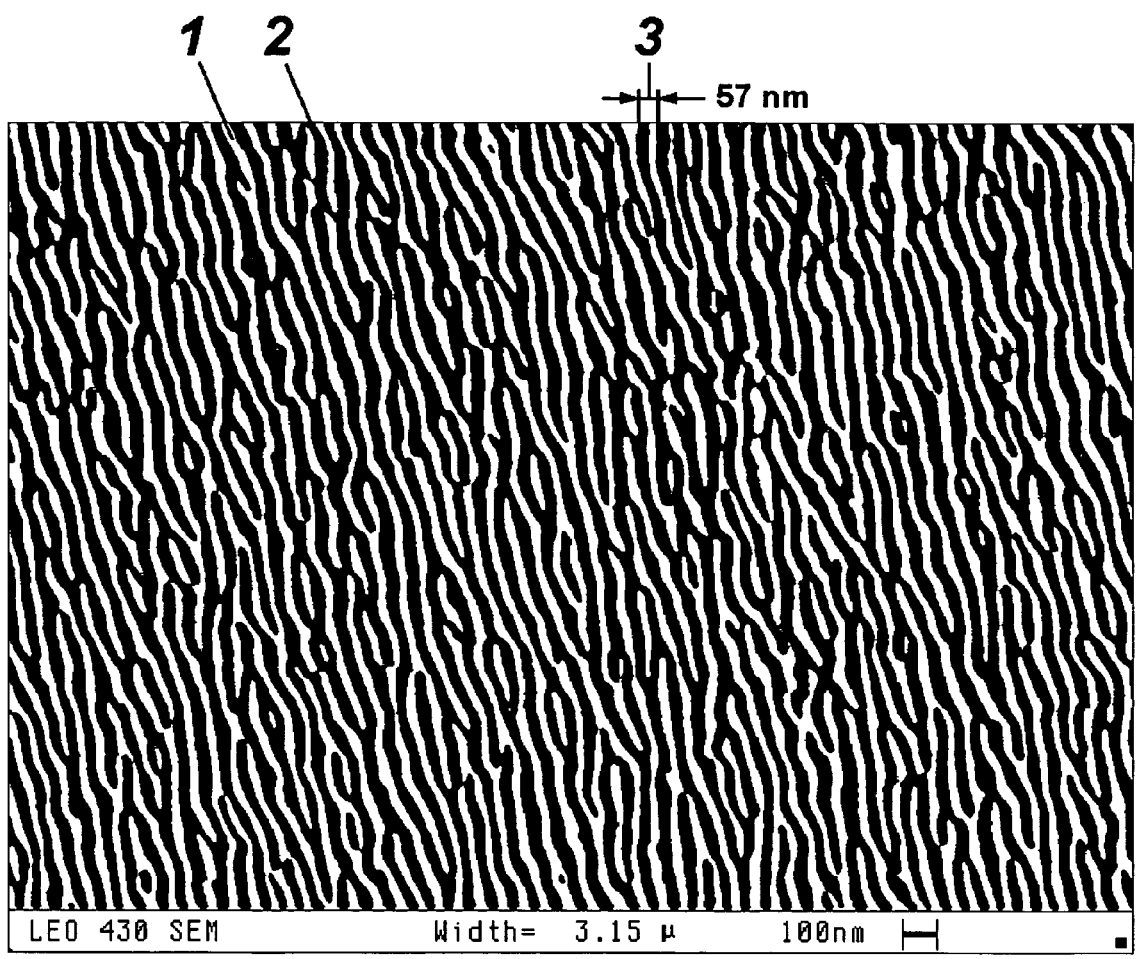
FIG. 3 illustrates a top view of another embodiment of nanotrench systems having a different period.

FIGS. 2 and 3 illustrate nanotrench systems showing their quasi-periodic nature and different periods. The illustrated nanotrench systems comprise nanotrenches, such as 1, and nanostringers, such as 2, with different periods, such as 3. As can be seen, FIG. 2 shows a continuous net of nanotrenches (most of the nanotrenches are connected), and FIG. 3 shows the continuous net of nanostringers (most of the nanostringers are connected).

Figure 4A:
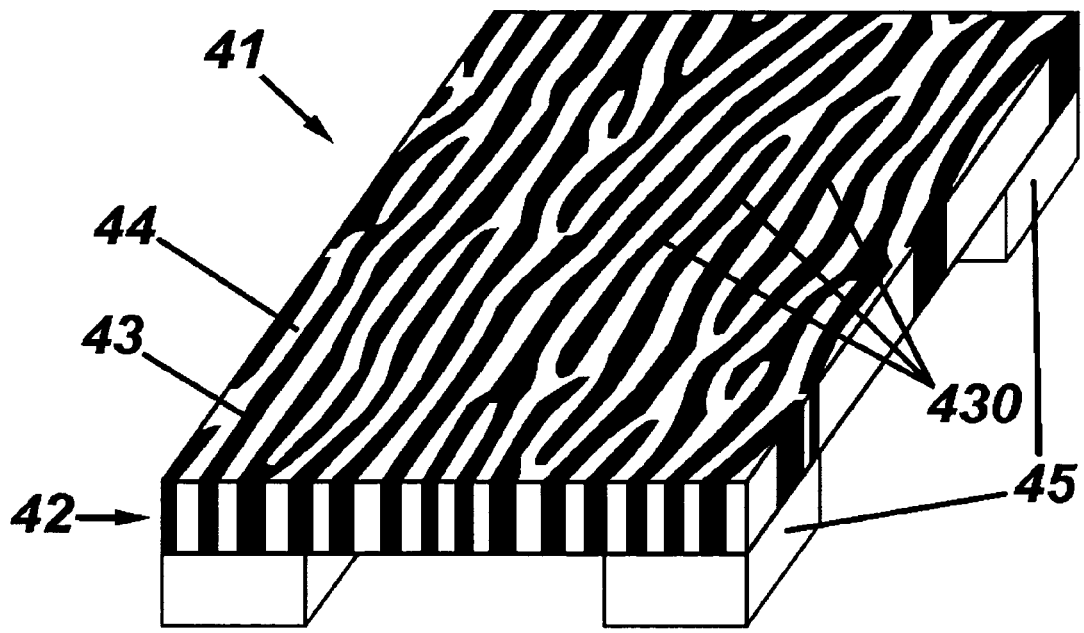
FIGS. 4a and 4b illustrate perspective views of two embodiments of the composite structure.

In one embodiment, an exemplary composite material is illustrated in FIG. 4a. The system of nanotrenches 41 is formed in $SiO_2$ 42 with pronounced one-dimensional orientation. The orientated nanostructure is composed of elongated elements, 43, having, for example, dimensions 60-90×600-5000 nm as viewed from the top. These dimensions are proportional to the structure period λ=120-180 nm. In case of the structure period λ=40-60 nm elongated elements have preferred top view dimensions 20-30×200-2000 nm.

The second material 44 is filled into the system of nanotrenches built in the first material to close the openings and bond the nanostringers into one composite structure. In this combination, the active material 44 serves as a soft connecting component and nanostringers 43 serve as hard ridges. Such a composite structure of the membrane significantly enhances membrane mechanical durability. Support structures 45 can be provided to hold the membrane in place. Such structure may be made of silicon. The composite membrane can also be positioned on any porous ceramic support, preferably, having a polished top surface.

It should be noted that the second material 44 in some preferred embodiments does not completely fill all the vertical space in the nanotrenches. Such embodiments are illustrated subsequently in connection with FIG. 4e.

The skeleton (first material 42) preferably has relatively strong mechanical characteristics. In some applications the first (skeleton) material is chosen so that it is chemically inert to the second material 44 to avoid degradation of the active properties of the second material.

In one preferred embodiment the first material is chosen from the group consisting of silicon, silicon dioxide, silicon nitride and silicon carbide. The selection of such material will be determined based on the desired application, as will be understood by a person skilled in the art.

The active component (second material 44) can be chosen from a group of materials capable of separating a given component from a mixture of components (e.g., separate hydrogen from other gases) or capable of being a catalyst as is known in the art. In addition, the second material preferably has good adhesion to the skeleton material to attach reliably to the skeleton material. Preferably the active material is chosen from the group consisting of platinum, palladium, nickel, ruthenium, rhodium, gold, yttrium, vanadium, tantalum, niobium, titanium and corresponding alloys thereof. In particular, the following materials can be used: binary alloys of palladium such as Pd-40Cu, Pd-23Ag, Pd-7Y, as well as Pd alloyed with Ni, Au, Ce, Fe and amorphous alloys of Group IV and Group V metals. The selection of such material will be determined based on the desired application, as will be understood by a person skilled in the art.

In yet another embodiment, the active component has magnetic properties. The second material can be chosen from a group of materials having any single or a combination of the following properties: magnetic, capable of component separation, and capable of being a catalyst. For applications requiring the active component to have a combination of component separation, being a catalyst, and magnetic properties, the second material 44 can be chosen from, for example, iron, cobalt, nickel, neodymium iron boron (NdFeB), samarium cobalt (SmCo), dysprosium, niobium, vanadium, gallium, and polymeric magnetic materials.

In one embodiment the process of filling the nanotrenches with these materials will comprise deposition followed by electroplating. Suitable deposition techniques include physical vapor deposition, such as sputtering, chemical vapor deposition, and the like. The resultant nanostructured magnetic composite material can exhibit unique highly anisotropic magnetic properties. For example, a very small magnetic field is typically used to change the magnetization state of these nanostructures. An ultra thin composite material with such anisotropic magnetic properties may also be useful in manufacturing magnetic sensors and magneto-optic storage media devices. Magnetic thin membranes may also be used in a variety of fields to control the transport of substances by changing the magnetic state of the active component.

Figure 4B:
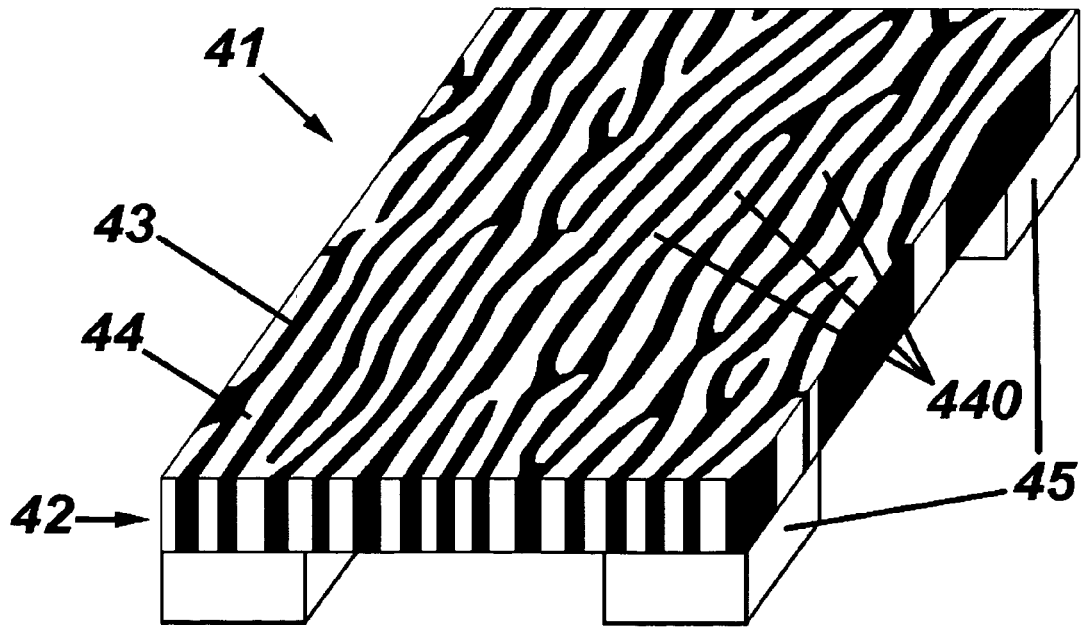

In one embodiment the system of nanostringers 430 does not compose a continuous net as shown in FIG. 4a. In yet another preferred embodiment the pattern shown in FIG. 4a is inversed to form pattern shown in FIG. 4b. In this case the nanostringers 430 compose a continuous net and the system of nanotrenches 440 does not compose a continuous net.

In yet another embodiment the system of nanotrenches is built in the second material and the first material is filled in later to close the openings in the second material so as to create the fortified composite structure.

Figure 4C:
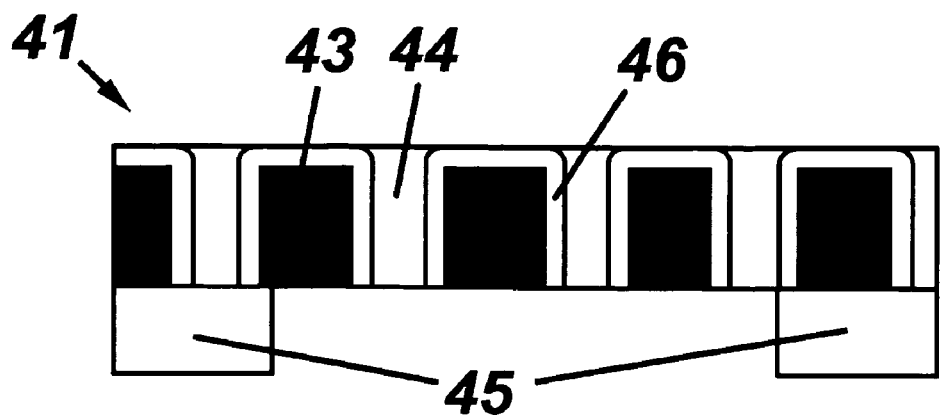
FIGS. 4c, 4d, and 4e illustrate cross-sections of different embodiments of the composite structure.

For some combinations of first material and second materials it is useful to improve adhesion between the first and the second materials. In one embodiment, the nanotrenches are covered by a third material creating an interface between the first and the second materials. FIG. 4c illustrates a cross-sectional view of one embodiment of the device of FIG. 4a with the third material illustrated as 46. In addition to improving the adhesion properties, said interface layer 46 could be used to prevent or resist contamination of the active material 44 by the first material 42. For example, the third material can be chosen from the group consisting of titanium, chromium, vanadium and tantalum. The selection of such material will be determined based on the desired application, as will be understood by a person skilled in the art.

Figure 4D:
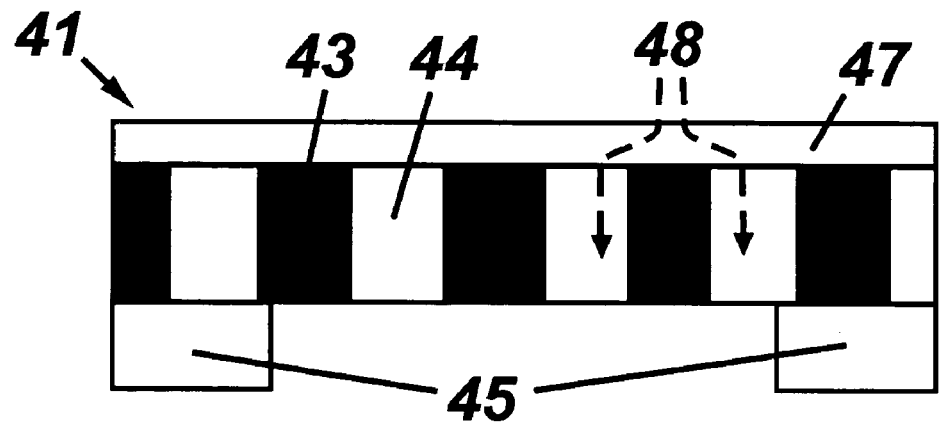

To increase the mechanical durability of the composite material and to improve its permeability, the upper side of the structure 41 can be covered by an additional ultra thin protection layer of a fourth active material, if desired. The fourth material is illustrated as 47 in the cross-sectional view in FIG. 4d. Said protection layer 47 may strengthen the system by bonding the nanotrenches to the common upper layer, as illustrated in FIG. 4d. In addition, said active protection layer 47 may improve permeability by creating connecting diffusion paths 48 through the active material 44 deposited into adjacent nanotrenches. For example, the fourth material can be chosen from the group consisting of platinum, palladium, nickel, ruthenium, rhodium, gold, yttrium, vanadium, tantalum, niobium, titanium and corresponding alloys thereof. In particular, the following materials can be used: binary alloys of palladium such as Pd-40Cu, Pd-23Ag, Pd-7Y, Pd alloyed with Ni, Au, Ce, Fe, and amorphous alloys of Group IV and Group V metals. The selection of such material will be determined based on the desired application, as will be understood by a person skilled in the art.

In one embodiment, said fourth material 47 is the same as the second material 44. In one embodiment the active insulating layer 47 could be deposited on top and bottom side of the composite material structure.

Figure 4E:
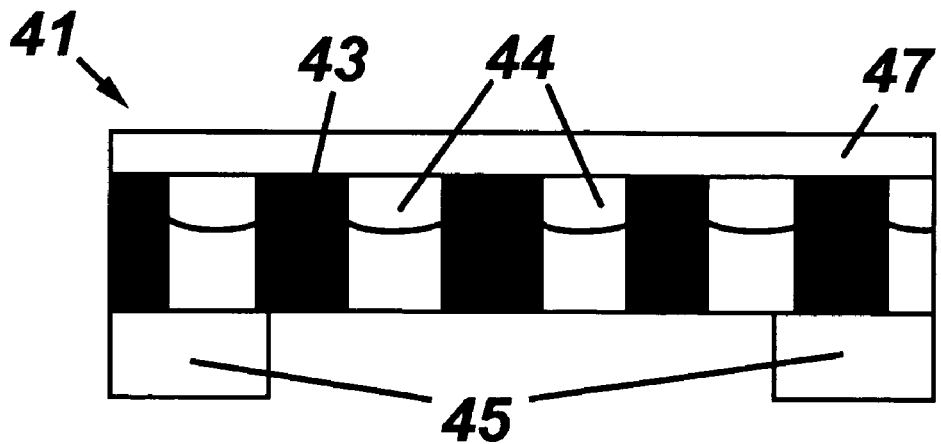
Figure 5A:
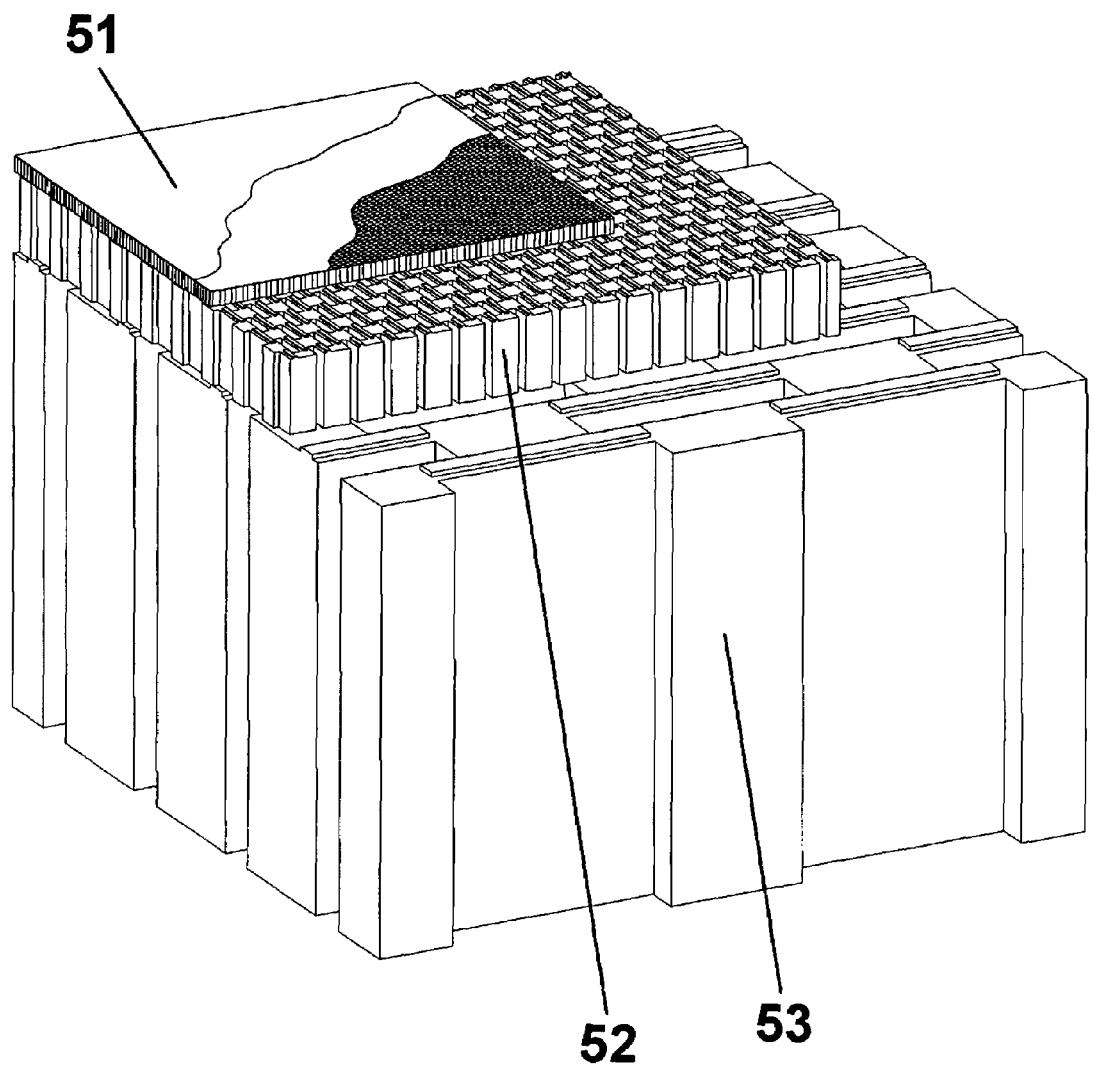
FIGS. 5a-5f illustrate various perspective views of an embodiment of a membrane employing the composite structure.

Due to the higher pressure differential and environmental conditions of certain applications, it is desirable to provide a membrane with higher durability and reliability characteristics. An example of such a membrane is illustrated in FIG. 5a. The composite material, as discussed in connection with FIG. 4e, is illustrated as 51. Supporting plates 52 and 53 are added at the bottom of the composite material structure 51. Said supporting plates are fabricated from the materials with strong mechanical characteristics. Silicon plates with the system of deep collecting channels or porous ceramic plates can be used as such materials. The support material can optionally include porous catalytic materials (e.g. $Fe_3O_4$, $Fe_3O_4/Cr_3O_4$ (90/10 wt %)); porous metals (including alloys) and other porous materials such as porous organic polymers and porous organic resins. The selection of such material will be determined based on the desired application, as will be understood by a person skilled in the art.

Figure 5B:
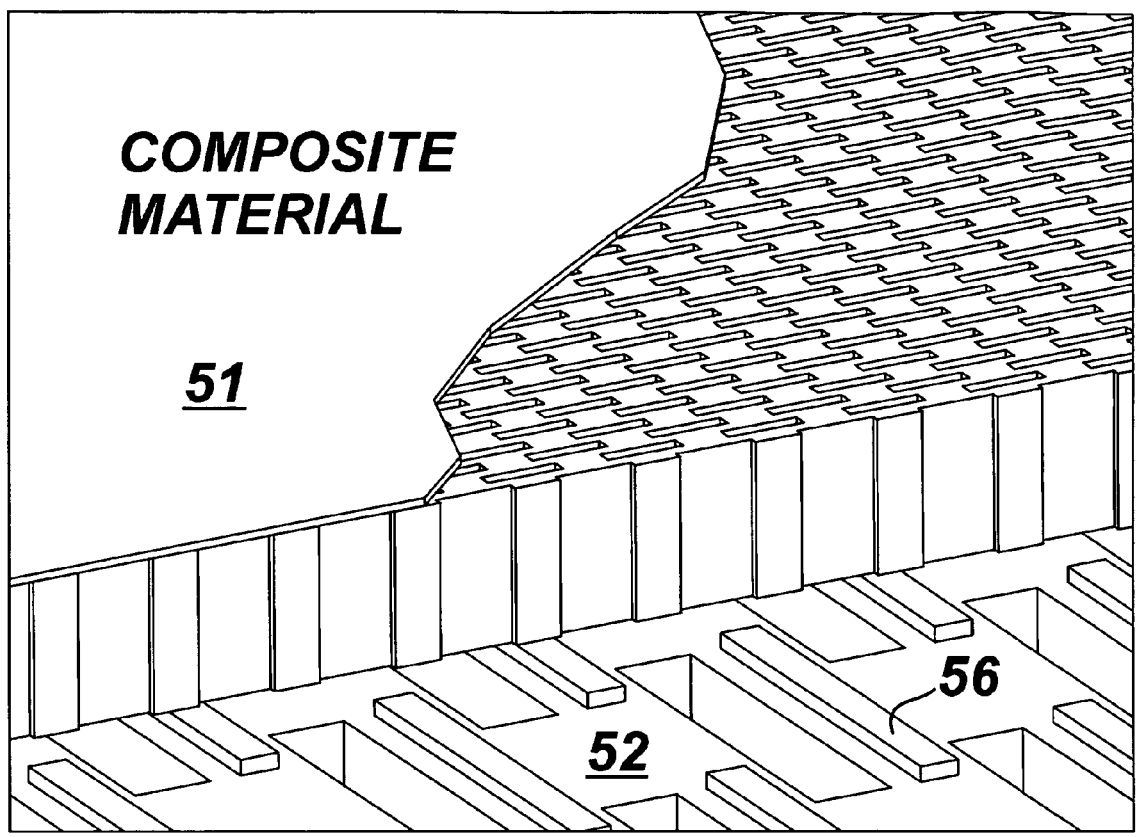
Figure 5C:
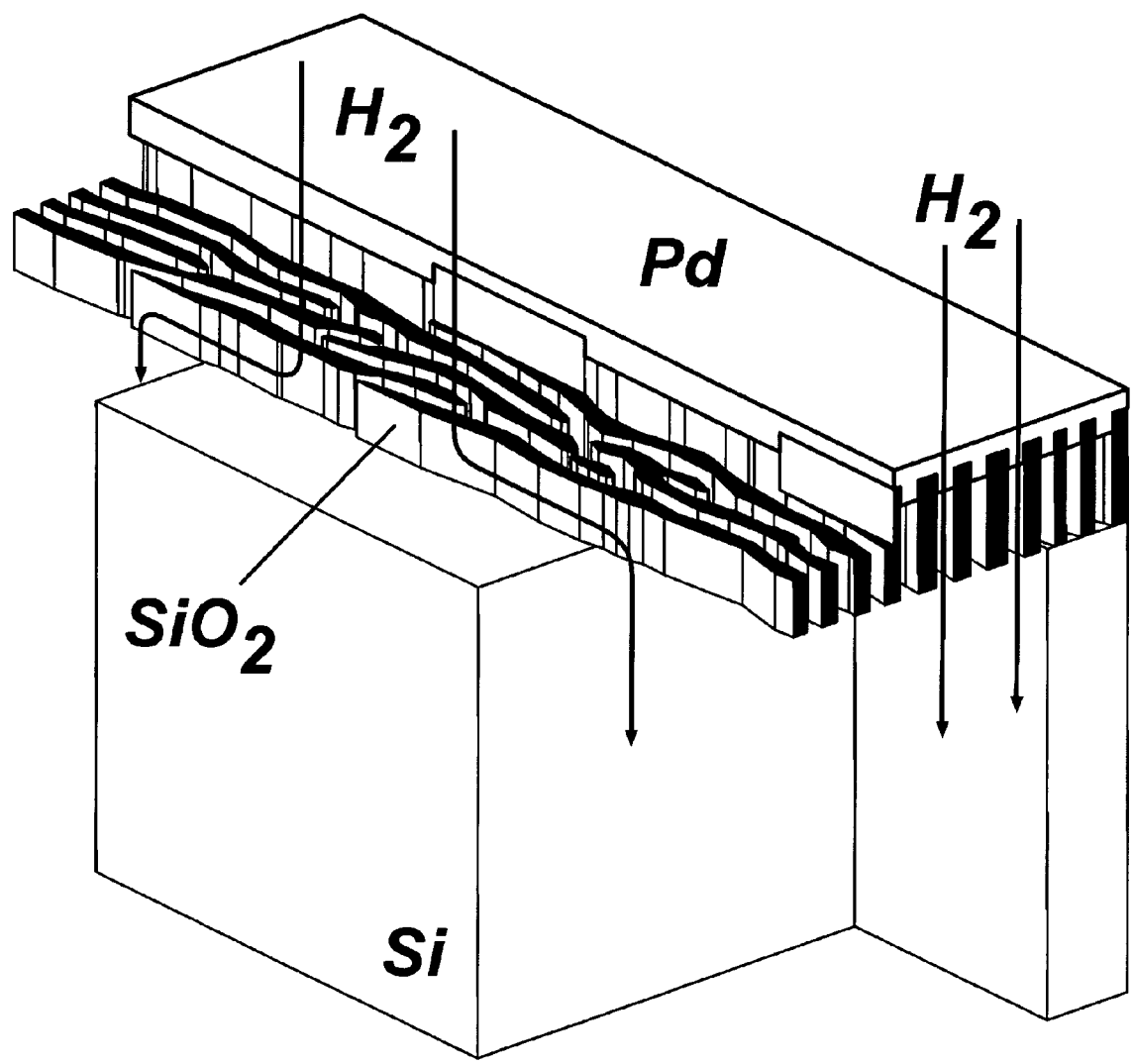
Figure 5D:
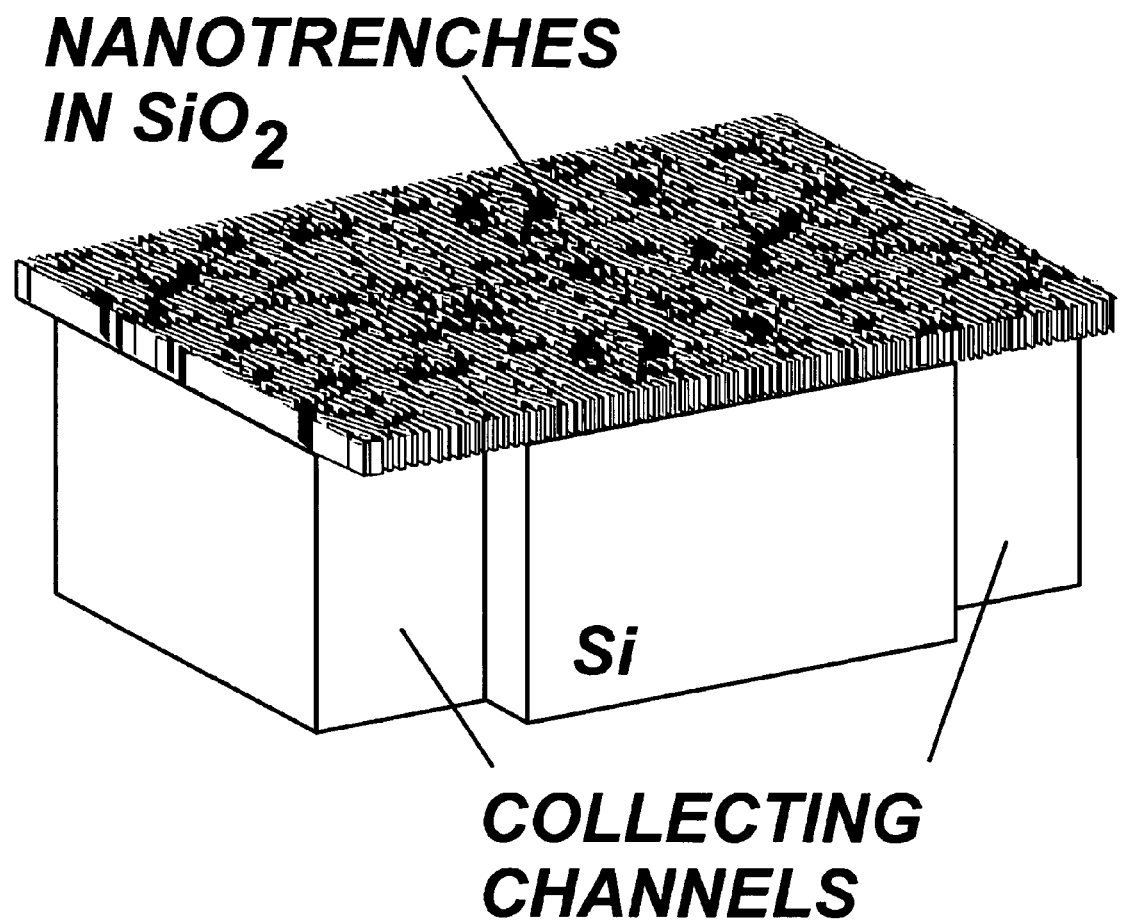
Figure 5E:
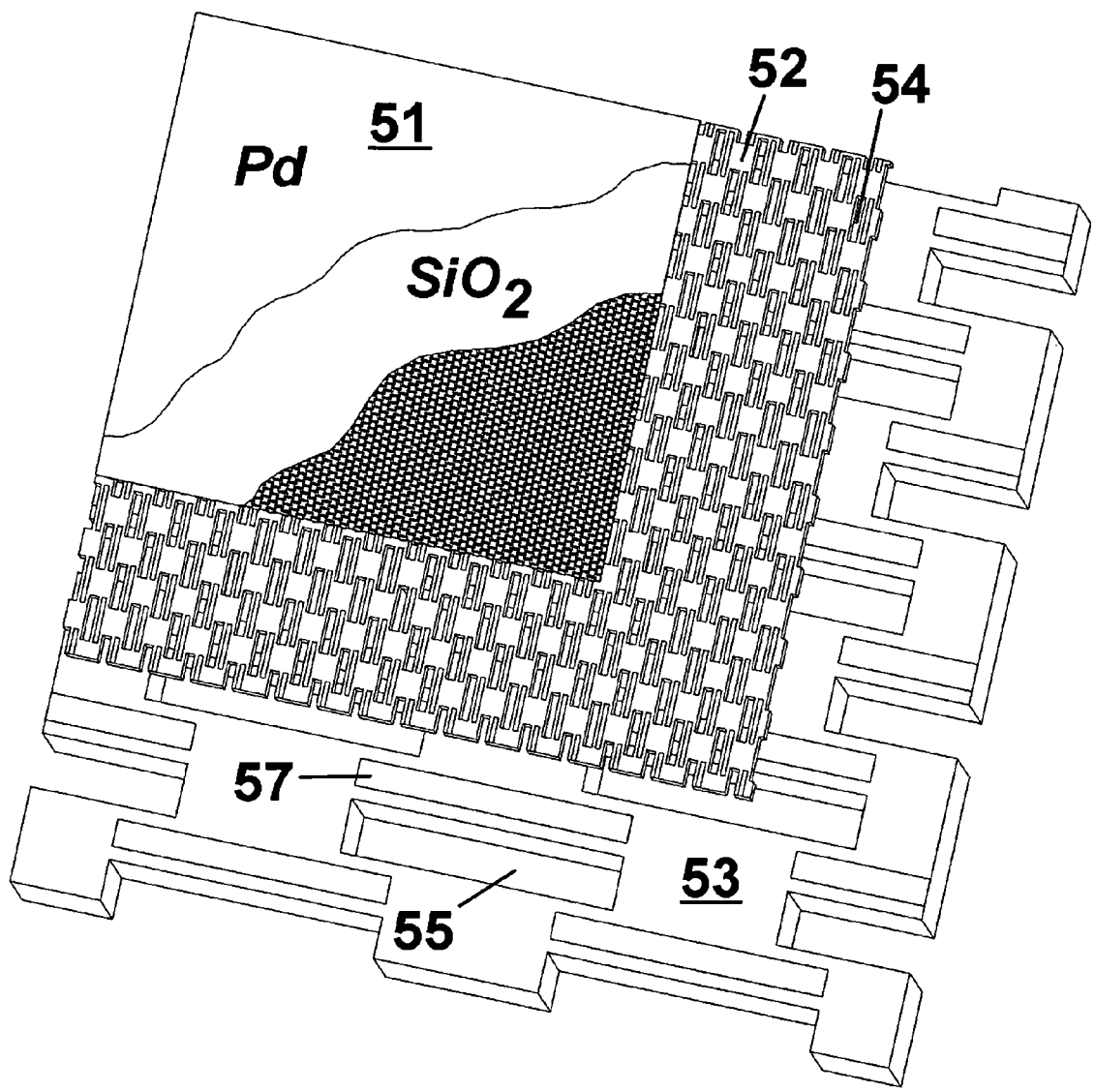
Figure 5F:
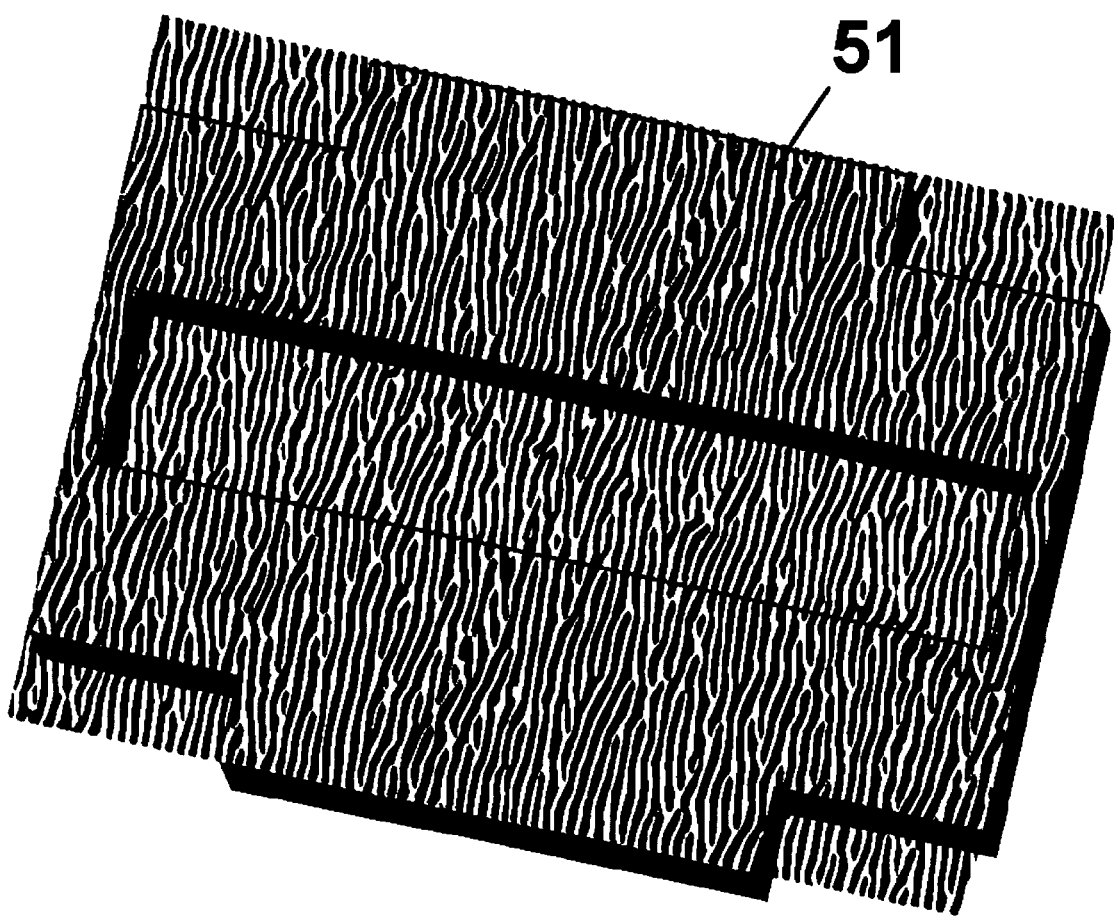

The example membrane of FIG. 5a is also illustrated in FIGS. 5b-5f. FIG. 5b illustrates a hydrogen separation application of the membrane as further discussed below. FIGS. 5c and 5d illustrate the nanotrenches more closely. FIGS. 5e and 5f illustrate the membrane of FIG. 5a, where the preferred relative orientation of the collecting channels in the supporting plates 52 and 53 is depicted more specifically. As illustrated, in this example, the channels of plate 52 are orthogonal to the channels of plate 53.

The improved permeability is achieved by fabricating a system of deep collecting vertical channels throughout each supporting plate, such as the channels illustrated as 54 and 55 in FIG. 5e. Preferably, said system of deep collecting channels is oriented at an angle to the selected nanotrench orientation. In one preferred embodiment, the channels in the form of slits are orientated perpendicular to the trenches. The slits in plate supporting composite material structure 51 could be about 1-2 µm wide, 10-20 µm long and 40-100 µm deep. In general it is preferred that the collecting channels have cross-section with at least one measure in the horizontal dimension (i.e., any direction in the plane parallel to the composite material layer) bigger than the period of the composite material. Stubs 56 and 57 are added as shown in FIG. 5b-5e to enhance the permeability of supporting plates 52 and 53.

In this configuration the nanostringers hang freely as air bridges above the slit openings as shown in FIGS. 5c, 5d, and 5f. In yet another preferred embodiment, said composite material structure is supported by a number of supporting layers with gradually increasing collecting channel dimensions as shown in FIG. 5e. It is preferable to build adjacent supporting layers with perpendicularly oriented collecting channels in a multi-support layer configuration. In one preferred embodiment said fifth material is the same as first material. In yet another preferred embodiment the fifth material is ceramics. A person skilled in the art, based on this disclosure, will be able to select one or more supporting structures as appropriate for a given application.

An example of a membrane for hydrogen separation is shown in FIG. 5b. In this embodiment the composite material 51 is made from silicon dioxide (skeleton or first material) and palladium (active or second material). The composite material structure is supported by two supporting plates 52 and 53 (shown in FIG. 5a), made from silicon, with orthogonally oriented collecting channels.

In one embodiment a hydrogen separation membrane is manufactured by performing the following steps as illustrated in FIGS. 6a-6j.

Figure 6A:
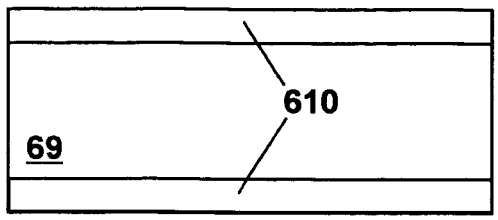
FIGS. 6a-6j illustrate, in cross-section, the steps in the manufacturing of a membrane comprising composite structure.

1. A 300-600 nm thick layer of thermal $SiO_2$ 610 is formed on the face and back surfaces of a 20-40 µm thin silicon wafer 69 with two polished sides (FIG. 6a).

Figure 6F:
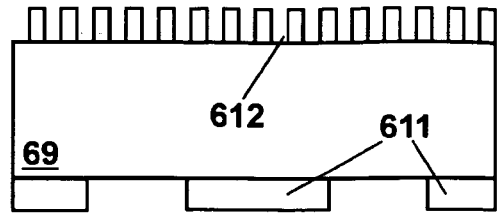
Figure 6B:
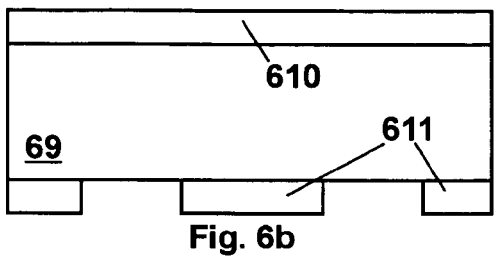

2. A mask 611 with 2×10 µm rectangular windows is formed on the backside of thin silicon wafer 69 (FIG. 6b).

Figure 6G:
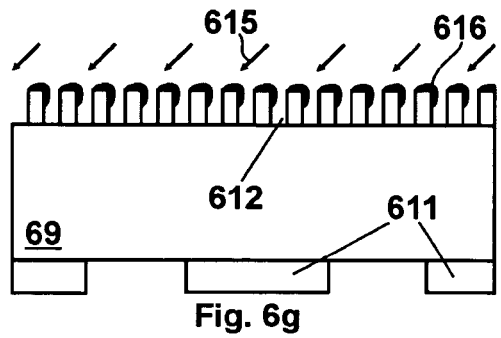
Figure 6C:
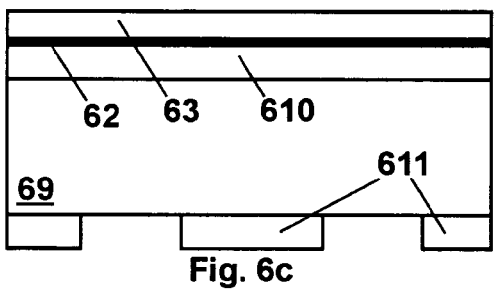

3. A 20-50 nm—thick metal layer 62 (Al or Cr) and 200-300 nm thick amorphous silicon (α-Si) layer 63 are deposited on top of the thermal $SiO_2$ layer 610 (FIG. 6c).

4. A wave ordered self forming structure (WOS) 65 is formed on the α-Si/Metal interface by exposing it to a nitrogen ion beam 64 with the resulting WOS wavelength about λ=20-400 nm. The technique of forming wave-ordered structures was previously developed and disclosed by the inventors of this invention. For example, this step can be accomplished by practicing the teaching disclosed in the following publications, incorporated herein by reference in their entirety: U.S. Pat. No. 6,274,007 and Smirnov et al., "Wave-ordered structures formed on SOI wafers by reactive ion beams," *Nuclear Instruments and Methods in Physics Research B,* 1999, v. 147, pp. 310-315, Elsevier Science Ltd. As a result of this process, a thin layer of silicon nitride 66 is formed on the part of the WOS surface 65 facing the ion beam flow 64. The resultant configuration of the wave-ordered nanostructure is depicted on the FIG. 6d.

5. A reactive ion etching (RIE) plasma process as known in the art is applied to WOS 65 and metal film 62, with thermal $SiO_2$ layer 610 used as a stop-layer to obtain a metal nanomask comprising silicon nitride 66, amorphous silicon 68 and metal 67, as depicted on the FIG. 6e.

6. In the next step, an array of deep nanotrenches 612 is formed by applying RIE using a $C_4F_8$—Ar plasma through the metal nanomask. In this example, the nanotrenches are 600 nm deep and 65 nm wide. Subsequently, the remnants of the silicon nitride 66 and amorphous silicon 68 are burned out by SF6 plasma and the remnants of the metal 67 are removed either by wet etching or by applying a RIE with plasma selective to $SiO_2$. The resulting array of nanotrenches is depicted in FIG. 6f.

Figure 6H:
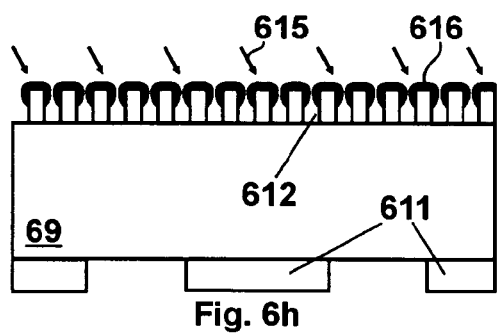
Figure 6D:
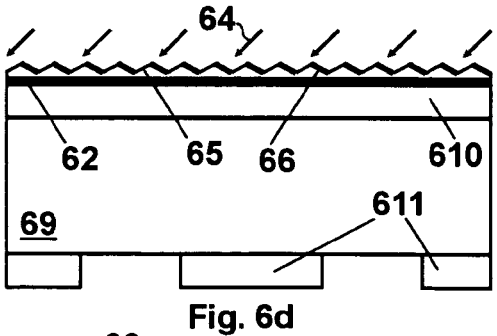
Figure 6I:
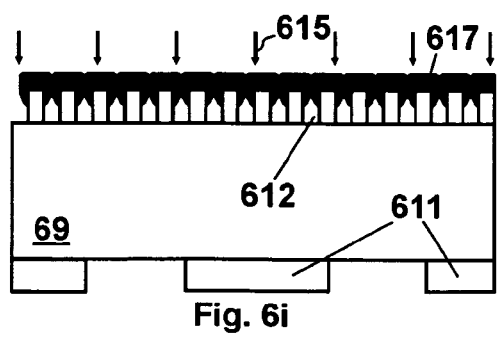
Figure 6E:
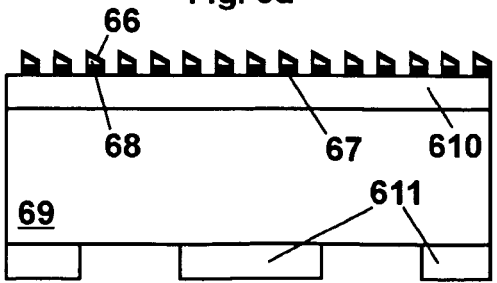
Figure 6J:
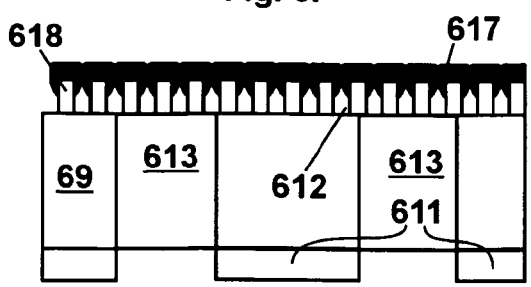

7. In the next step, the desired composite $SiO_2$—Pd material is formed by obliquely depositing palladium 616 into the nanotrenches. The direction of the flow of Pd atoms 615 in the oblique deposition mode is perpendicular to the orientation of the nanotrenches array. Two opposite oblique orientations and one orthogonal orientation of the flow of Pd atoms are used for the deposition as depicted in FIG. 6g-6i.

8. Finally, deep collecting channels 613 are formed by subsequently applying RIE in C4F8 and SF6 plasma through the metal mask 611 on the backside of the thin silicon wafer to the bottom of nanotrenches in $SiO_2$. The RIE process has high selectivity with respect to $SiO_2$ and Pd. After RIE, the separating plate 618 is annealed at working temperatures 200-600° C. in inert atmosphere. The supporting plates 52 and 53 with deep collecting channels are manufactured by applying lithography and etching processes known to those skilled in the art using the foregoing description and accompanying figures.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. Doubtless numerous other embodiments can be conceived that would not depart from the teaching of the present invention whose scope is defined by the following claims.

What is claimed as new and desired to be protected by Letters Patent of the United States is:

1. A composite structure comprising:
   a composite layer comprising:
      a first material having a plurality of nanotrenches formed therein as a quasi-periodic, anisotropic array of vertical trenches having a wave-ordered structure pattern and with non-uniform periodicity in the range between 20 and 400 nm, wherein the nanotrenches are formed as openings between bordering elongated elements of the first material and extend completely through the first material from a top side to an opposing bottom side; and
      a second material deposited within the nanotrenches, said second material is different from the first material.

2. The composite structure of claim 1, further comprising an adhesion enhancement material disposed between at least a portion of the first and second materials.

3. The composite structure of claim 2, wherein the adhesion enhancement material is titanium, chromium, vanadium or tantalum.

4. The composite structure of claim 1, further comprising a second layer disposed on the composite layer, the second layer comprising a third material that is different than the first material.

5. The composite structure of claim 4, wherein the second and third materials are the same.

6. The composite structure of claim 1, further comprising a support layer upon which the composite layer is disposed.

7. The composite structure of claim 6, wherein the support layer comprises the first material.

8. The composite structure of claim 1, wherein the first material is silicon, silicon dioxide, silicon nitride, or silicon carbide.

9. The composite structure of claim 1, wherein the second material comprises a catalytic material.

10. The composite structure of claim 1, wherein the second material is active and is platinum, palladium, nickel, ruthenium, rhodium, gold, yttrium, vanadium, tantalum, niobium, titanium, or an alloy thereof.

11. The composite structure of claim 1, wherein the second material is active and is an amorphous alloy of a Group IV metal, an amorphous alloy of a Group V metal, or a binary alloy of palladium.

12. The composite structure of claim 1, wherein the second material is active and comprises a magnetic material.

13. The composite structure of claim 1, wherein the second material is active and is dysprosium, niobium, vanadium, gallium, iron, cobalt, nickel, or an alloy thereof or neodymium iron boron, samarium cobalt, or a polymeric magnetic material.

14. The composite structure of claim 1, wherein the nanotrenches are partially filled with the second material so that the second material does not extend to the bottom side of the composite layer.

15. The composite structure of claim 1, wherein at least some of the bordering elongated elements are in the range between 10 and 250 nm in a first horizontal dimension and between 100 and 2500 nm in a second horizontal dimension.

16. The composite structure of claim 1, wherein the periodicity of the array is in the range between 20 and 100 nm.

17. The composite structure of claim 2, further comprising a second layer disposed on the composite layer, the second layer comprising a third material that is different than the first material.

18. The composite structure of claim 4, wherein the third material is platinum, palladium, nickel, ruthenium, rhodium, gold, yttrium, vanadium, tantalum, niobium, titanium, or an alloy thereof.

19. The composite structure of claim 1, wherein the first material is active and is an amorphous alloy of a Group IV metal, an amorphous alloy of a Group V metal, or a binary alloy of palladium.

20. The composite structure of claim 1, wherein the first material is active and comprises a magnetic material.

21. The composite structure of claim 1, wherein the first material is active and is dysprosium, niobium, vanadium, gallium, iron, cobalt, nickel, or an alloy thereof or neodymium iron boron, samarium cobalt, or a polymeric magnetic material.

22. The composite structure of claim 1, wherein the second material is silicon, silicon dioxide, silicon nitride, or silicon carbide.

23. A membrane, comprising:
(a) a composite layer comprising:
a first material having a plurality of nanotrenches formed therein as a quasi-periodic, anisotropic array of vertical trenches having a wave-ordered structure pattern and with non-uniform periodicity in the range between 20 and 400 nm, wherein the nanotrenches are formed as openings between bordering elongated elements of the first material and extend completely through the first material from a top side to an opposing bottom side; and
a second material deposited within the nanotrenches, said second material is different from the first material and is a catalytic material, or a material capable of component separation, or a magnetic material; and
(b) a support layer upon which the composite layer is disposed, the support layer defining a plurality of channels though which the composite layer is exposed.

24. The membrane of claim 23, wherein the nanotrenches are generally aligned along a direction and the channels of the support layer are not parallel to the nanotrenches.

25. The membrane of claim 24, further comprising a second support layer upon which the support layer is disposed, the second support layer comprising channels that are not oriented parallel to the channels of the support layer.

26. The membrane of claim 23, wherein the support layer comprises a porous material or a perforated plate.

27. The membrane of claim 23, wherein the composite layer has a thickness of no more than 0.1 μm.

28. A composite structure comprising:
a composite layer comprising:
a first material having a plurality of nanotrenches formed therein as a quasi-periodic, anisotropic array of anisotropic vertical trenches having a wave-ordered structure pattern and with non-uniform periodicity in the range between 20 and 400 nm, wherein the nanotrenches are formed as openings between bordering elongated elements of the first material, at least some of which having the size in the range between 10 and 250 nm in a first horizontal dimension and between 100 and 2500 nm in a second horizontal dimension; and
a second material deposited within the nanotrenches, said second material is different from the first material;
wherein the nanotrenches extend from a top side of the composite layer to a bottom side of the composite layer and the nanotrenches are partially filled with the second material so that the second material does not extend to the bottom side of the composite layer.

29. A membrane manufactured in accordance with the steps comprising:
depositing a layer of thermal $SiO_2$ on the face surface of silicon wafer;
forming a α-Si/metal interface by depositing a metal layer and, subsequently an amorphous silicon (α-Si) layer on top of the thermal $SiO_2$ layer;
forming a wave-ordered structure (WOS) with wavelength about λ=20-400 nm on the α-Si/metal interface by exposing said interface to a nitrogen ion beam;
forming a metal nanomask comprising silicon nitride and portions of the amorphous silicon layer and metal layer;
forming an array of nanotrenches in portions of the thermal $SiO_2$ layer not covered by the metal nanomask;
removing remnants of the silicon nitride and the amorphous silicon; and obliquely depositing an active material, which is a catalytic material, or a material capable of component separation, or a magnetic material, into the nanotrenches.

30. The composite structure of claim 1, wherein the second material fills the nanotrenches.

31. The composite structure of claim 30, wherein the second material is a catalytic material, or a material capable of component separation, or a magnetic material.

* * * * *

UNITED STATES PATENT AND TRADEMARK OFFICE
CERTIFICATE OF CORRECTION

| | | |
|---|---|---|
| PATENT NO. | : 7,604,690 B2 | Page 1 of 1 |
| APPLICATION NO. | : 11/100175 | |
| DATED | : October 20, 2009 | |
| INVENTOR(S) | : Smirnov et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

Fifth Day of October, 2010

David J. Kappos
*Director of the United States Patent and Trademark Office*